United States Patent [19]
Edelman et al.

[11] Patent Number: 5,283,839
[45] Date of Patent: Feb. 1, 1994

[54] APPARATUS CAPABLE OF FIGURE-GROUND SEGREGATION

[75] Inventors: Gerald Edelman; Olaf Sporns; Giulio Tononi, all of New York, N.Y.

[73] Assignee: Neurosciences Research Foundation, Inc., New York, N.Y.

[21] Appl. No.: 636,637

[22] Filed: Dec. 31, 1990

[51] Int. Cl.$^5$ .............. G06K 9/62; G06K 9/34; H04N 7/18
[52] U.S. Cl. ................... 382/15; 382/9; 382/14; 395/21; 348/25
[58] Field of Search ............ 382/14, 15, 1, 9, 48; 358/105; 364/274.9, 276.6, 972.4; 395/21, 23, 24

[56] References Cited

U.S. PATENT DOCUMENTS

| | | | |
|---|---|---|---|
| 4,739,401 | 4/1988 | Sacks et al. | 382/1 |
| 4,931,868 | 6/1990 | Kadar | 358/105 |
| 4,937,878 | 6/1990 | Lo et al. | 382/1 |
| 5,034,986 | 7/1991 | Karmann et al. | 382/1 |
| 5,067,160 | 11/1991 | Omata et al. | 382/1 |

OTHER PUBLICATIONS

Sporns et al., "Reentrant Signaling among Simulated Neuronal Groups leads to Coherency in their Oscillatory Activity", 86 Proc. Natl. Acad. Sci. USA, pp. 7265-7269, Sep. 1989.

Primary Examiner—Michael T. Razavi
Assistant Examiner—David Fox
Attorney, Agent, or Firm—Gottlieb, Rackman & Reisman

[57] ABSTRACT

Apparatus which segments visual scenes into discrete objects. The apparatus is able to perceptually group the elements corresponding to a coherent figure, and to segregate them from the background or from another figure. Reentrant signaling among rhythmically active neuronal groups is used to correlate responses along spatially extended contours. The efficacy of the connections is allowed to change on a fast time scale resulting in active reentrant connections which amplify the correlations among neuronal groups and provides the desired segmentation.

4 Claims, 8 Drawing Sheets

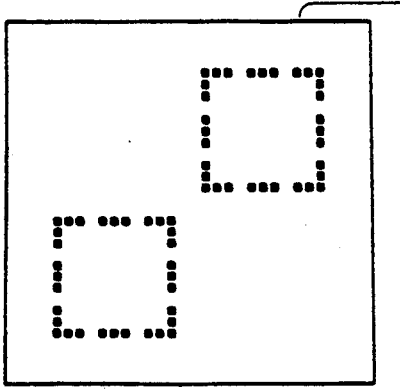
FIG. 1A
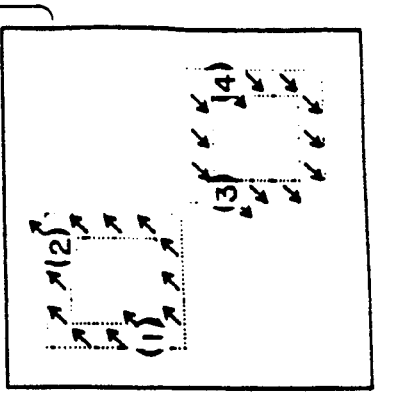
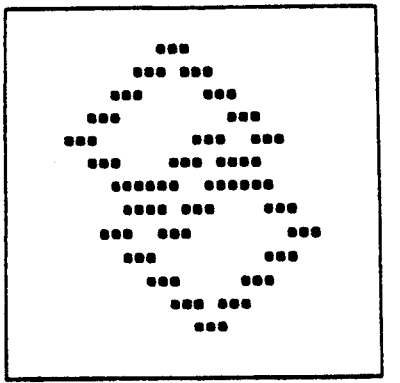
FIG. 1B
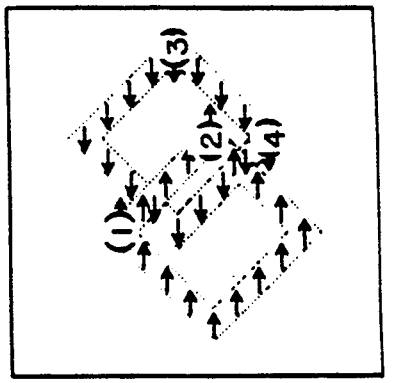
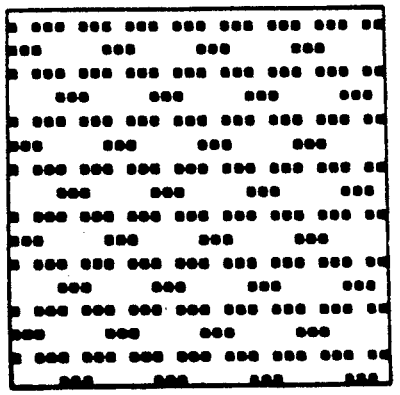
FIG. 1C
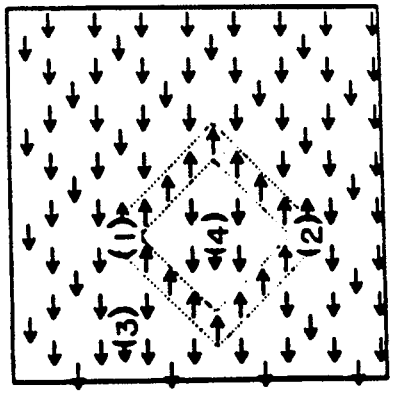
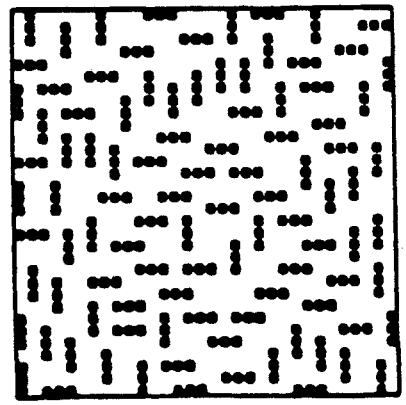
FIG. 1D
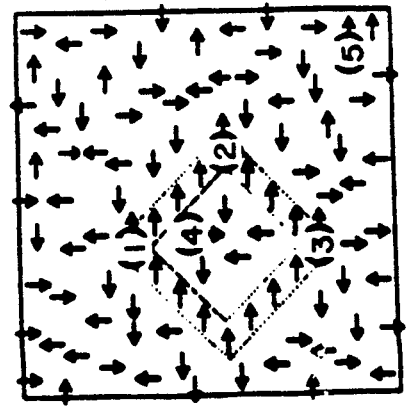

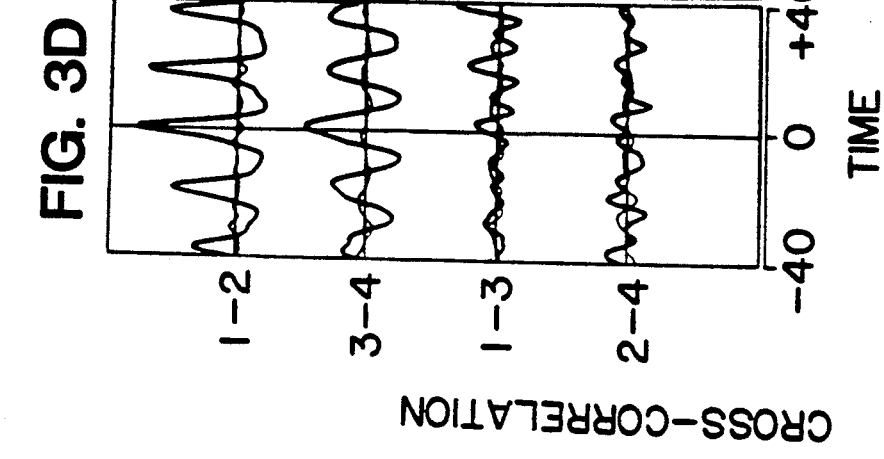
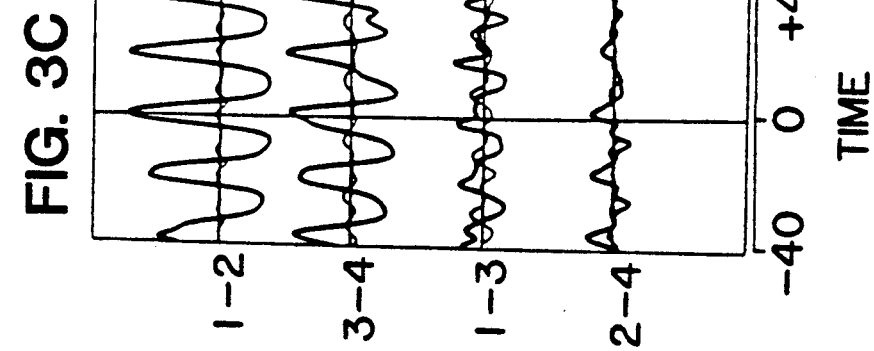
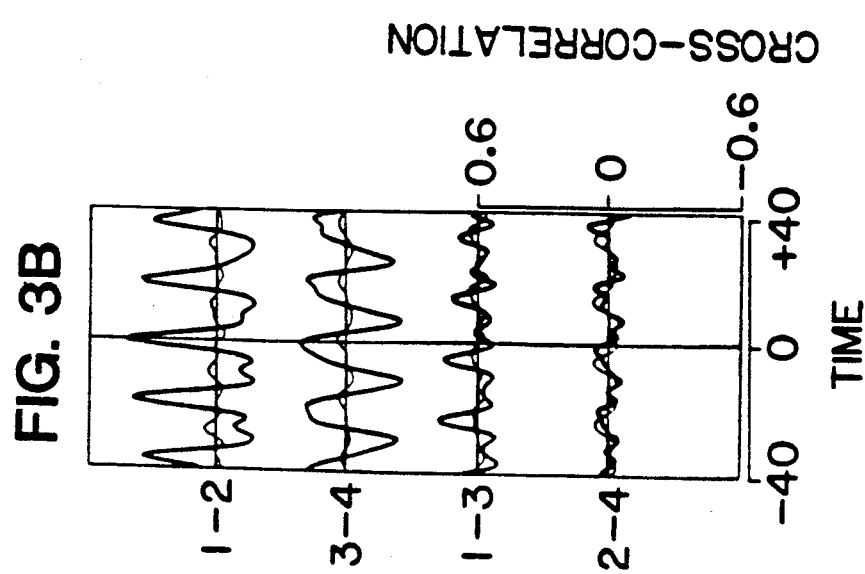

APPARATUS CAPABLE OF FIGURE-GROUND SEGREGATION

BACKGROUND OF THE INVENTION

The present invention relates to robotics, and in particular to apparatus controlled by a computer simulated neuronal network. As used herein the term robotics refers not only to completed robots capable of performing physical tasks but also to an apparatus which provides output information that may be used as an input by, for example, unintelligent electromotive devices. The invention enables such apparatus to distinguish simple figures from a background on the basis of the movement of the figure relative to the background. This is an important step towards an artificial vision system capable of segmenting complex visual scenes into discrete components such as objects. The present invention does not assume in advance any particular configuration for the moving figure or the background. In effect it quickly adapts to the shape of the moving figure in ways suggestive of the actual functioning of real nervous sytems.

There have been attempts to simulate intelligence systems capable of visual scene segmentation. The present invention deals with a fundamental aspect of this task, perceptional grouping and figure-ground segreation. This refers to the ability to group together elementary features into discrete objects and to segregate these objects from each other and from the background. Psychologists have identified fundamental aspects of such perceptual grouping and segmentation, such as those of similarity, continuity, proximity, and common motion. To mention an example taken from human psychology, if, within an array of moving elements, some nearby elements start to move coherently with the same velocity and direction, they are immediately perceived as a single figure segregated from the background. Computer programs that directly look for such effects prove to be ineffective when confronted by slight modifications of the environment in which they were programmed to operate. A more effective way to provide these aspects is to develop a computer simulated neuronal network capable of performing grouping and segmentation. The present invention is concerned with such neuronal networks, in particular those that employ reentrant interactions along reciprocal excitatory connections among neuronal groups.

The development of apparatus for figure-ground segregation by networks has been held back because the neural basis for such grouping and segmentation is still largely unknown. Hierarchical models have been suggested, which are composed of multiple layers of specialized detectors of increasing specificity. These require an enormous number of cells and lengthy computation times and, as a result, have never resulted in an actual apparatus. Another suggestion was to simulate neurons responding to a single, coherent object and that would interact cooperatively to form an "assembly" identified by a high firing rate, while other, unrelated neurons would fire at a lower rate. However, such a system cannot deal with stimuli containing multiple different objects.

A further alternative is to rely on the belief that neurons may express their relatedness by temporal correlations of activity. Recent experimental evidence supports this hypothesis. Orientation selective and direction selective cells in the cat primary visual cortex tend to discharge in an oscillatory fashion when stimulated appropriately. The frequency of these oscillations varies stochastically around 50 Hz. However, groups of cells with non-overlapping receptive fields become tightly synchronized when they respond to a coherent stimulus such as a long light bar. Correlations are reduced or absent if two unconnected bars are used. Thus, the phase coherency of oscillatory activity in the visual cortex may be used to link together spatially separated parts of an extended contour.

The present invention is an improvement upon work published as "Reentrant signaling among simulated neuronal groups leads to coherency in their oscillatory activity", 86 Proc. Natl. Acad. Sci. USA pp. 7265-69 (Sep. 14, 1989), (herein "Sporns et al"). In that article we examined a computer simulation of a neuronal network and observed correlations generated by reciprocal reentrant signaling between the activity of distant neuronal groups. The simulation of reentrant activity between arrays of neuronal groups selective for oriented lines and pattern motion displayed cross-correlations between groups that were responsive to different parts of a stimulus contour if there was colinearity of the stimulus. As used in that work, the term "reentry" refers to a process of ongoing dynamic signaling via reciprocal connections between distant neuronal groups.

BRIEF DESCRIPTION OF THE PRESENT INVENTION

In the present invention, we have modified and extended our previous work in order to address the problem of perceptual grouping and distinguishing figures from their background, which is referred to as "figure-ground segregation". A key difference from the previous work is that the synaptic efficacy of reentrant connectivity is allowed to change on a fast time scale. This mechanism allows existing correlations to be rapidly amplified and at the same time decouples groups which are not correlated. As a result temporal correlations established by reentrant circuitry allow the network to group together those elements which correspond to a figure and at the same time segregate them from other figures or from the background.

The present invention also differs from the previous work by having a different pattern of connections, termed a "network architecture". Examples of these differences are the density of connections falling off with distance and the addition of connections between layers of the cells.

An apparatus constructed according to the principles of the present invention comprises a device for sensing a visual field including an input array on which patterns or visual scenes are captured, (for example, by use of a television camera), a collection of interconnected networks of neuronal elements that respond to input patterns, and an arrangement for coupling these networks to specified motor-output functions. This may be accomplished by an additional layer of cells that detects correlated neuronal activity and signals the location of the objects in the visual scene. Given that information a motor device could manipulate the object.

Patterns represented on the input array correspond to objects in the real world which move; mechanisms for detection of motion have been provided in a preferred embodiment of the apparatus. Each recognizing element, called a "group" (as a short form of "neuronal group"), is a connected assembly of neuron-like units ("cells"). The state of each cell is characterized by a single time-dependent scalar variable, $s_i(t)$, variously referred to as the state of cell i at time t, or the output of cell i at time t. It is dependent principally upon "synaptic strengths", $c_{ij}$, also referred to as the "connection strengths" and a "synaptic efficacy" $e_{ij}$. The terms $c_{ij}$ and $e_{ij}$ refer to the strength and efficacy of the jth input to cell i ($c_{ij}$ or $e_{ij} > 0$, excitatory; $c_{ij}$ or $e_{ij} < 0$ inhibitory). Unlike the previous work, the values of the synaptic efficacy vary with time in the present invention.

In the present invention the synaptic strength $c_{ij}$ remains fixed. The present invention achieves its performance in part because of a mechanism of synaptic efficacy modification. This mechanism is governed by an amplification function, which is the rule controlling the alteration of the "synaptic efficacy", $e_{ij}$, of a connection according to the activity of the input and output groups termed "pre- and postsynaptic groups". In particular, the synaptic efficacy is modified to include a term that provides for the fast decay of the effect of a stimulus. To accomplish this, a formula is introduced for the synaptic efficacy that contains two parameters $\delta$ and $\gamma$, which respectively parametrize the increase and the decrease in the synaptic efficacy leading to correlations between neuronal firings. The presence of these factors allows the system to more rapidly achieve its output ($\delta$) and subsequently return to its quiescent state ($\gamma$).

BRIEF DESCRIPTION OF THE DRAWINGS

FIGS. 1A-1D depict visual stimuli illustrating phenomena of perceptual grouping and figure-ground segregation.

FIGS. 3A-3E depict cross-correlograms of neuronal responses to stimuli shown in FIG. 1.

DETAILED DESCRIPTION OF A PREFERRED EMBODIMENT

Figure 5:
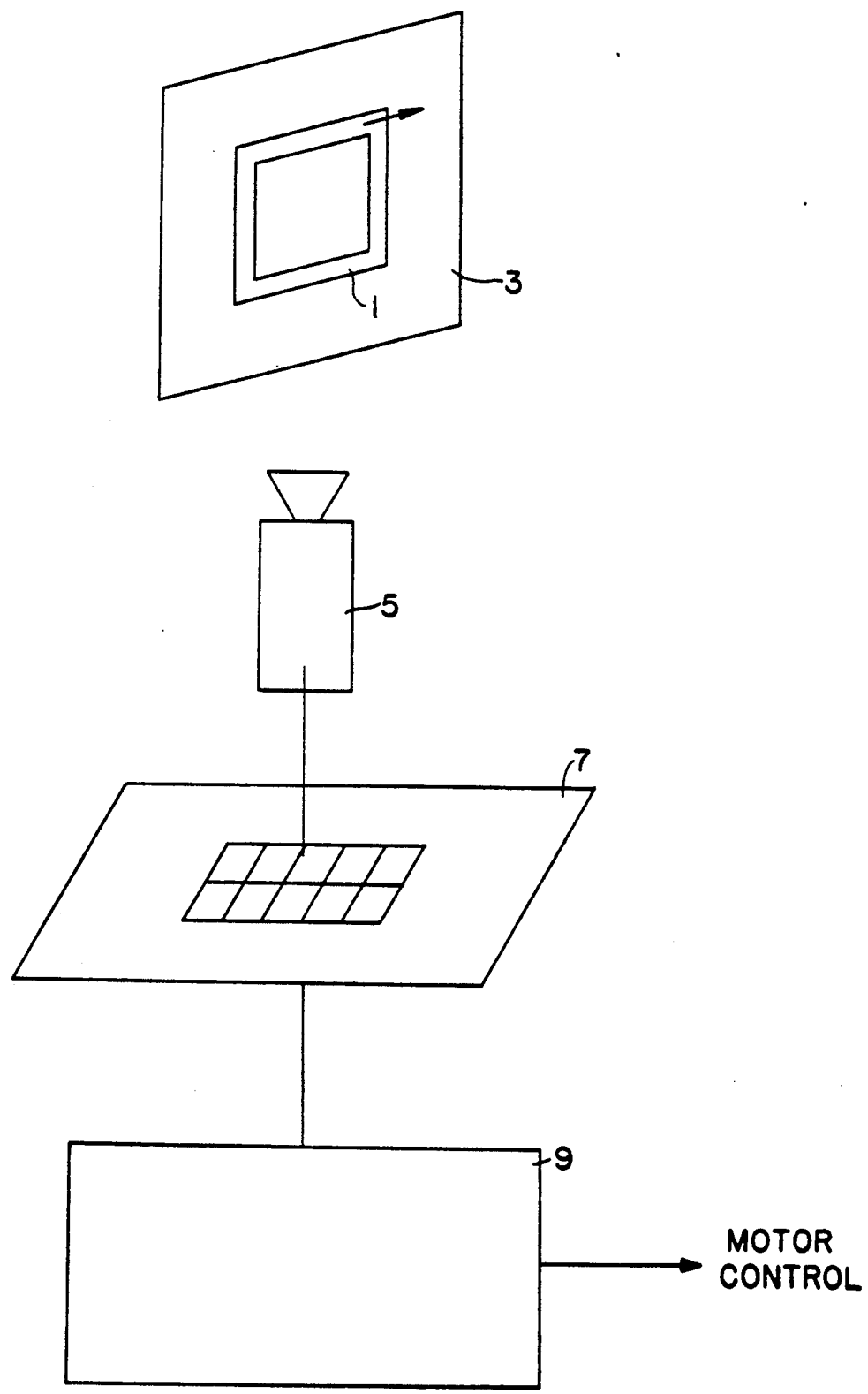
FIG. 5 depicts the overall arrangement of the components of the present invention.

A preferred embodiment of the present invention comprises an apparatus for distinguishing figures from background on the basis of movement of the figures relative to the background. As shown in FIG. 5, an object 1 made of elementary 12 forms such as bars or other simple pixel elements moves against a background 3 of similar elements. This constitutes the visual 14 field of the apparatus. To demonstrate the power of the apparatus the example is considered where the object is indistinguishable from background until it commences a coherent motion, such as a uniform translation in a single direction for a short period of time. The object is viewed by a video camera 5 so that the visual field is mapped onto a matrix of semiconductor elements such as layer of charge coupled diode (CCD) components 7. The state of the elements of this layer may then be polled by a computer so that the state of the visual field is provided as digital data to a computer 9 running a simulation of the neuronal network of the present invention. The computer a in turn provides as output data a digital readout of the coordinates of the moving FIG. 1.

A preferred embodiment of the invention was implemented using the Cortical Network Simulator program on an NCUBE parallel computer. Such a computer is well known to persons of skill in this art as a typical hypercube architecture. The Cortical Network Simulator (CNS) permits a digital computer (serial o parallel) to simulate the activity of any number of neurons connected together in any desired anatomical arrangement. There is no programmed limit on the number of cells or connections between them, nor on the number of different kinds of cells or kinds of connections between them. The CNS represents in computer memory the geometry of the network being simulated and the means of correlating generic parameters contained in linked record structures with the specific parameters of a given cell. This is described in detail in copending patent application Ser. No. 419,524, filed Oct. 10, 1989 now U.S. Pat. No. 5,136,687 issued Aug. 4,1992, entitled "Categorization Automata Employing Neuronal Group Selection With Reentry", and assigned to the same assignee. The disclosure of that application is also incorporated herein for its further discussion of the meaning of specialized terms used throughout this disclosure.

A means for simulating desired anatomical arrangements of neurons with specified realistic biophysical properties has also been developed. It includes a means for representing the connectivity of neuronal segments in matrix form so that a computer simulation can efficiently traverse a list of simulated elements and compute the response voltage of each in a cyclical manner. This is also described in detail in copending patent application Ser. No. 419,524, U.S. Pat. No. 5,163,687 issued Aug. 4, 1992 referred to above.

Figure 2:
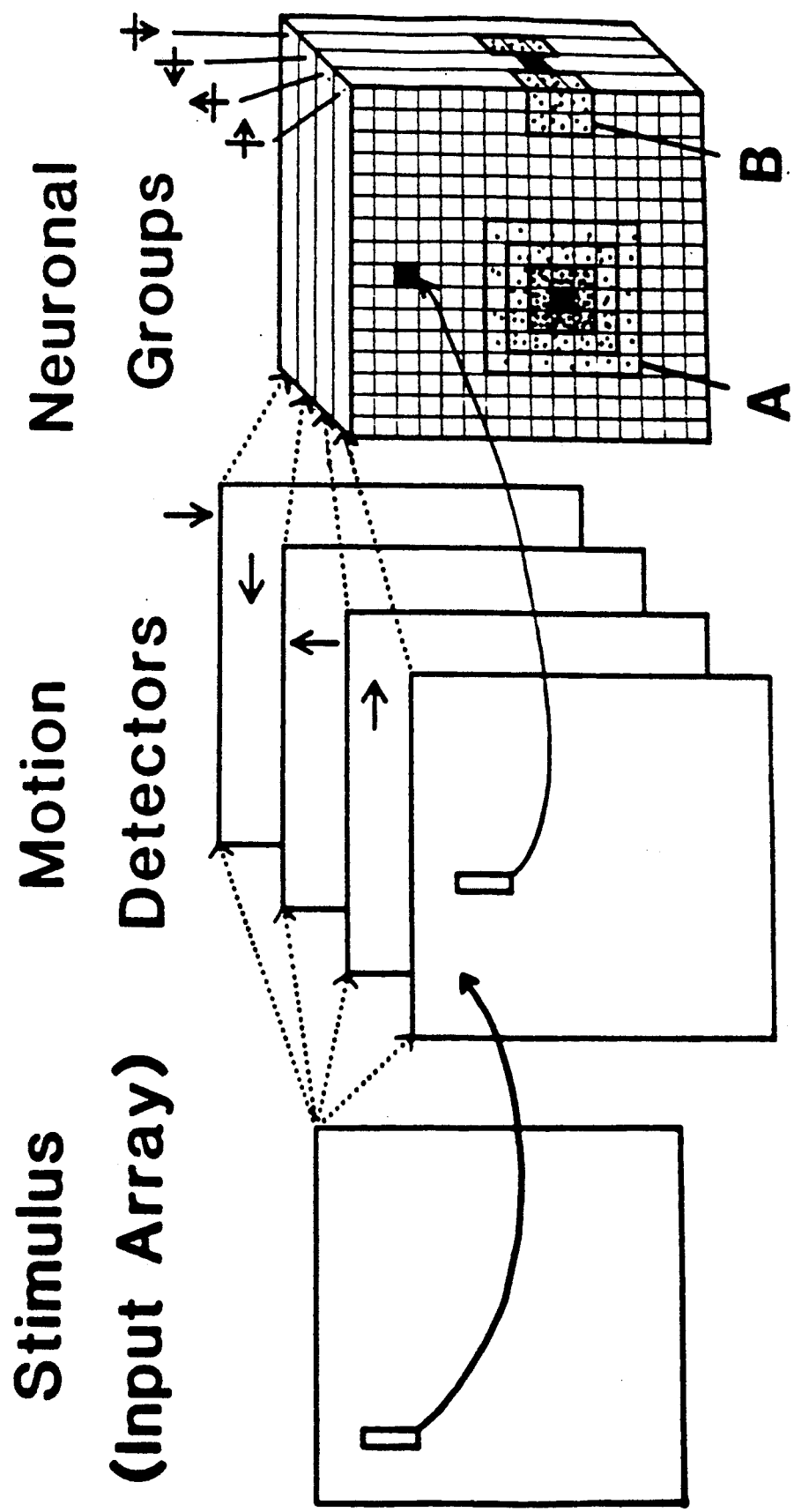
FIG. 2 depicts a schematic diagram of the model architecture.

The model, as shown in FIG. 2, consists of an input array, four sets of elementary feature detectors and four repertoires of neuronal groups. In the present example the detectors are selective for the direction of motion of short light bars presented in the input array and they provide input to repertoires of direction selective and orientation selective neuronal groups. The general concept of neuronal groups is described in our copending patent application Ser. No. 419,524 U.S. Pat. No. 5,136,687 issued Aug. 4, 1992 referred to above. The light bars could result from the detection by video cameras of actual objects located in physical space.

In FIG. 1, typical displays (pixel images) of oriented bars are shown in the top row, which this embodiment is capable of distinguishing. The direction of motion of the component bar for one particular example is indicated by arrows in the bottom 17 row. Coherently moving ensembles of bars are enclosed by a stippled border. The stimuli consist of: (A) A figure (diamond) coherently moving to the right and a background composed of bars moving in randomly selected directions. (B) The same figure moving to the right and a coherent background moving to the left. (C) Two identical and overlapping, but differently moving figures (diamonds). (D) Two differently moving figures (squares). These stimuli are representative of a video image of similarly configured objects. The corresponding correlations between parts of the responding neuronal network are shown in FIG. 3 in corresponding panels marked with the same letters (A-D). Encircled numbers with arrows in the bottom row of FIG. 1 refer to the specific locations whose corresponding neuronal activity is displayed in FIG. 3. The y-axis values in FIG. 3 show the magnitude of the correlations.

The pattern of reentrant connectivity used in the model is consistent with anatomical and physiological data: groups with different orientation specificity are reentrantly connected only if their receptive fields are overlapping, (that is, if they are not too far apart in the neuronal network) while groups of the same specificity are connected over longer distances.

As shown in FIG. 2 the apparatus comprises an input array (left; 32×32 pixels), four sets of elementary feature detectors (middle; containing 32×32 cells each), and four repertoires of neuronal groups (right; containing 16×16 groups each). The elementary feature detectors are direction-selective for movements of pixels in the input array in each of four directions, up, down, left, and right. Their direction-selectivity is generated by a mechanism similar to the one described in Sporns et al.

In every group of direction-selective units, there is a subpopulation of inhibitory units that stay active for some time after activation. They provide time-delayed inputs to the direction-selective units, which fire only in response to a concurrence of movement in their preferred direction and appropriate input from the orientation selective layer.

In contrast with Sporns et al, the four repertoires of direction-selective neuronal groups (each group containing 40 excitatory and 20 inhibitory cells, for a total of 15,360 cells per repertoire) receive topographically ordered inputs from one of the four sets of elementary feature detectors; specifically, each excitatory cell receives 9 connections arranged in an oriented matrix. An oriented matrix of connections is a standard way known to persons of ordinary skill in this art to generate orientation selectivity. As a result, these groups are both direction- and orientation-selective.

Each excitatory cell also receives 10 connections from other excitatory cells and 10 connections from inhibitory cells within each group, while each inhibitory cell receives 10 connections from excitatory cells. The precise pairing of cells for this and all other types of connections and in the preferred embodiment is not critical to the performance of the invention.

In addition, each excitatory cell receives two kinds of reentrant connections. First, there are 30 connections from excitatory cells in groups of same specificity distributed over a concentric area of 7×7 groups (see "A" in FIG. 2). The density of these reentrant connections falls off exponentially with distance (indicated in the diagram by stippling, extending from the groups marked in black). Second, there are 10 reentrant connections from excitatory cells in groups with overlapping receptive fields, whose directional specificity differs by 90 degrees (see "B" in FIG. 2).

For purposes of demonstrating the operation of the preferred embodiment of the invention the components of all stimuli were moved at a velocity of 1 pixel per 2000 time steps. When one iteration corresponds to 1 msec, 1 pixel to 1 degree of the visual field, and the distance between adjacent neuronal groups to about 500 $\mu$m, then the parameters yield an oscillation frequency of about 50 Hz, a stimulus velocity of 0.5 degrees per second, a receptive field area of 1×3 degrees for single cells, a visual field of 32 degrees diameter, figure sizes of about 18 degrees, and a spatial extent of 3-4 mm for reentrant connections in a visual cortical layer of about 16×16 mm.

Key differences in architecture between this model and the previous one are: (i) the larger size of the stimulus and neuronal arrays; (ii) the simulation of only one map, direction and orientation as opposed to separate maps for orientation and pattern motion but one with connections among repertoires of different specificities; (iii) smaller neuronal group with slightly denser connectivity within the group; (iv) intra-areal reentrant connectivity arranged in concentric rings and decreasing density with distance; and, most significantly (v) activity-dependent changes in synaptic efficacy.

The activity of single cells is computed as $$s_i(t) = [\Sigma_j(c_{ij}+e_{ij}) \cdot s_j]_{73} + N + \omega s_i(t-1) \quad [1]$$

with: $s_i$, $s_j$ = states of units i, j ($0 \leq s1$); t = time (in what follows, one iteration or time step in the computer simulations corresponds to one msec of real time); $c_{ij}$ = baseline synaptic strength and $e_{ij}$ = fast-changing synaptic efficacy between unit j (source) and unit i (target; $0 \leq c_{ij}+c_{ij} \leq 1$ for excitatory connections); j = index over individual afferent connections; $[]_{73}$ = input threshold (inputs set to 0, if below $\Theta$; $\Theta$ subtracted from inputs otherwise); N = Gaussian noise; $\omega$ = decay coefficient.

At the beginning of a simulation, each synapse is assigned a baseline $c_{ij}$ value, which is non-zero and remains constant throughout the run, and an $e_{ij}$ value, which is zero. For reentrant connections and excitatory-excitatory connections within a neuronal group, the synaptic efficacy $e_{ij}$ is allowed to change as a result of pre- and postsynaptic activity, according to $$e_{ij}(t+1) = (1-\gamma)e_{ij}(t) + \delta\phi(e_{ij})(s'_i - \Theta_I)(s'_j - \Theta_J)R \quad [2]$$

$$s'_{i,j} = \lambda s_{i,j}(t) + (1-\lambda)s'_{i,j}(t-1) \quad [3]$$

with: $\delta$ = amplification factor, a parameter which adjusts the overall rate of synaptic change; $\gamma$ = decay constant for synaptic efficacy; $S'_{i,j}$ = time-averaged activity of cells i, j; $\lambda$ = damping constant for averaged activity; $\Theta_I$, $\Theta_J$ = amplification thresholds relating to post- and presynaptic activity, respectively; R = 0 if $S_i \leq \Theta_I$ and $S_j \leq \Theta_J$ and R = 1 otherwise; $\phi(x)$ = sigmoidal function.

To determine the quality of performance of this example, auto- and cross-correlation analysis is performed on both single cell and population activity (the average activity of 40 excitatory cells in a neuronal group). For this purpose, the activity $s_i$ of single cells (Eq. 1) is interpreted as a firing probability and the average activity of a group is considered to be an analogue of a local field potential. Shift predictors as described in Perkel et al, 7 Biophys. J. 419-440 (1967), (herein "Perkel et al") are computed to evaluate the magnitude of the correlations due to the stimulus. The time-course of the cross-correlation function during a trial as shown in FIG. 4C was evaluated by advancing a 100 msec window in 2 msec time steps and computing the cross-correlation each time.

For purposes of this example, stimuli consist of a collection of equiluminant short light bars (horizontal and vertical), arranged in the input array and moved individually in one of four directions at constant velocity (see FIG. 1). Immediately before the start of each trial, the network is presented with a sequence of randomized subsets of bars. This leads to a brief transient of activity before the actual onset of the full stimulus, which randomizes the state of the networks by leaving the neuronal groups at varying phases in their oscillation cycles. This randomization is important in order to avoid artifactual correlations due to the switching on of the stimulus.

Figure 3A:
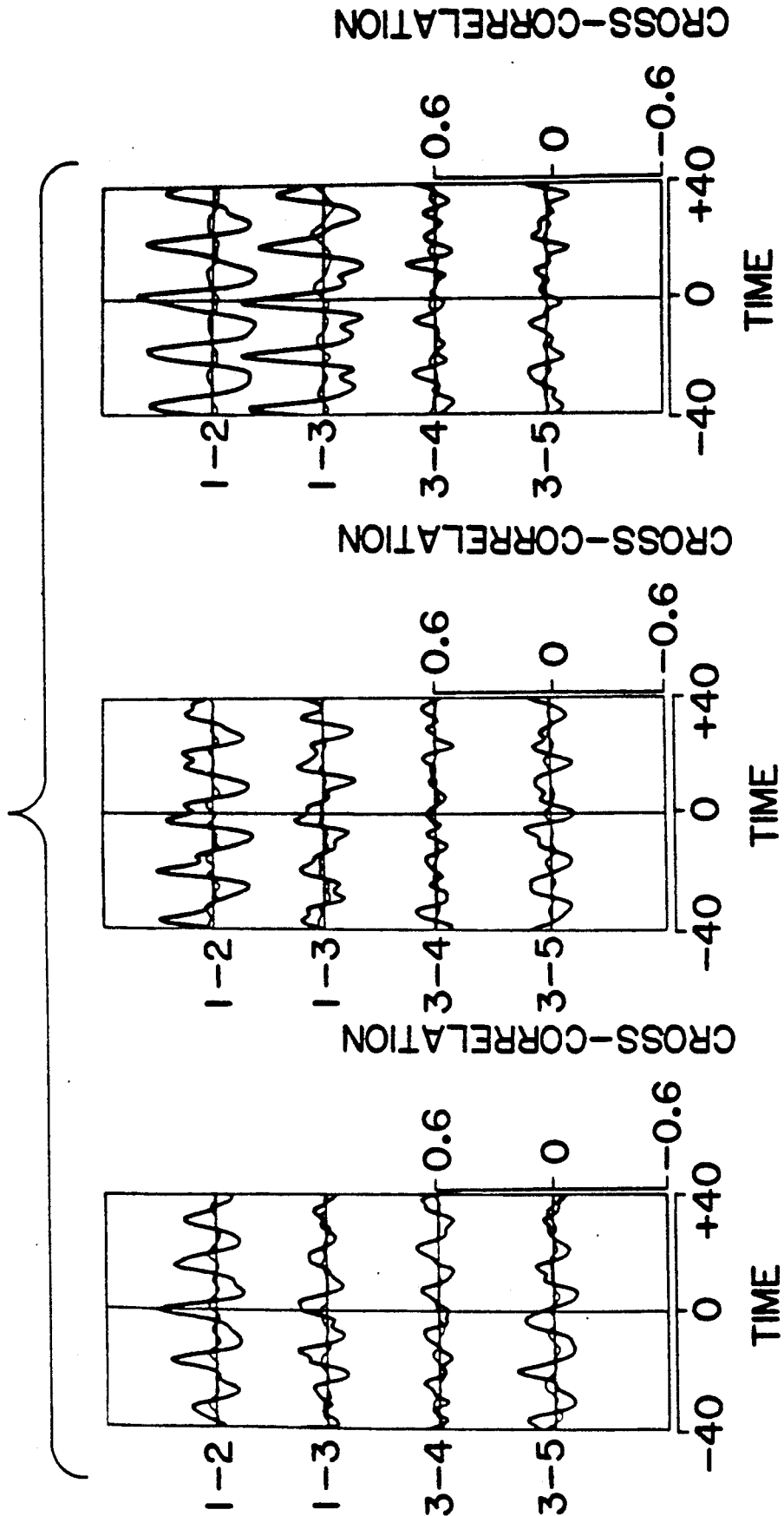
Figure 3E:
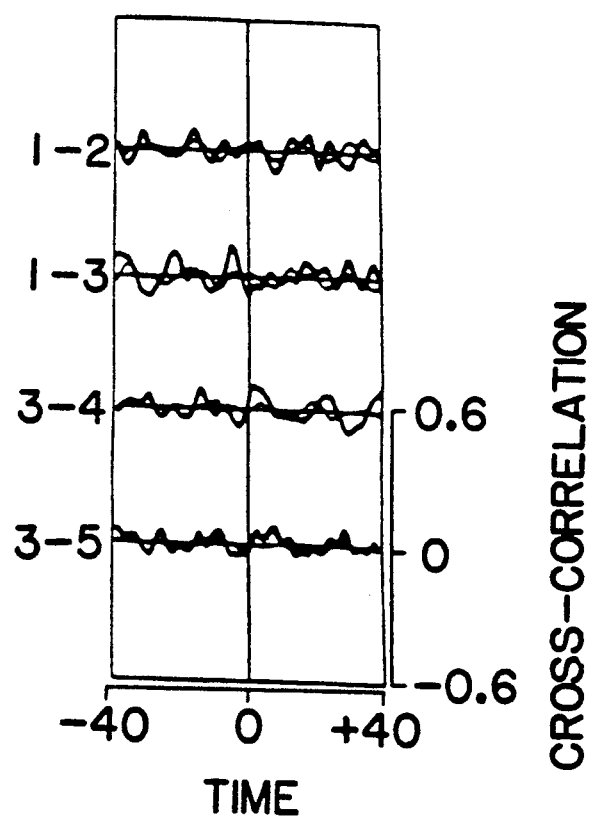

The example demonstrated temporal correlations in the activity of neuronal groups, which allowed segregation of a coherently moving figure from a random background. In FIG. 1A, an extended object composed of several continuous vertical bars moves to the right, embedded in a background of vertical and horizontal bars moving right, left, up and down at random. The oscillatory activity of the groups responding to parts of the moving object synchronize rapidly, usually within 5 oscillation cycles (100 msec), and phase-lock with near-zero phase delay (FIG. 3A). Coherency arises not only between nearby groups but also between distant groups with non-overlapping receptive fields that are not directly connected. On the other hand, groups responding to elements of the figure are not correlated with groups responding to elements of the ground. They are also not correlated with bars that move in the same direction but which are spatially separated from the figure. In all cases, the shift predictor is flat, indicating that the observed correlations are not locked to the stimulus.

The invention also segregates two coherently moving parts of the stimulus, such as a figure and a coherently rather than randomly moving ground (FIG. 1B), or two figures from each other (FIG. 1C). In both cases, the neuronal responses segregate into two coherent, but mutually uncorrelated subsets (FIG. 3B,C).

The contours of the figures in FIG. 1A,B,C consist of short vertical bars moving in the same direction. However, object contours may consist of line segments that have different orientations (e.g. vertical and horizontal contours of a square moving coherently in one particular direction: see FIG. 1d). In this case, correlation of neuronal responses requires reentrant connections among groups with different specificities and overlapping receptive fields. For both squares in FIG. 1d (one moving right-up, the other moving left-down), the responses to all segments of the contour become coherent; the responses to segments belonging to different squares, however, are uncorrelated (FIG. 3D).

FIG. 3 depicts the correlations arising from the operation of the present invention. The y-axis values are proportional to the value of the cross-correlation function for pairs of cells. (1.0 means maximal correlation; 0.0 means absence of correlation.) The figure shows the cross-correlograms of neuronal responses to stimuli shown in FIG. 1 (the identifying A–D letters correspond in the two FIGS.). See Perkel et al, suora. Cross-correlograms are computed over a 100 msec sample period and subsequently averaged over 10 trials. Numbers at the left refer to the locations of neuronal groups responding to parts of each respective stimulus as displayed in FIG. 1 (bottom row). (A) Correlograms of five neuronal groups are shown (figure-figure: 1-2, 1-3; figure-ground: 3-4, 3-5; see FIG. 1A) at three consecutive time points after stimulus onset (computed between msec 1 and 100, left msec 101 and 200, middle; msec 201 and 300, right). (B, C and D) Correlograms (figure-figure: 1-2, 3-4; figure-ground or figure$_1$-figure$_2$: 1-3, 2-4), between msec 201 and 300. (E) Correlograms between msec 201 and 300 for a control simulation identical to (A), but without synaptic efficacy change. All correlograms are scaled, and shift predictors (see Perkel et al), (thin lines, averaged over 9 shifts) are displayed for comparison. The dynamic parameters of synaptic efficacy change in FIGS. 3 and 4A,B were $\gamma=0.001$. $\delta=1.0$, $\Theta_{I,J}=0.01$, $\lambda=0.26$ (see Eqs. 2,3).

A key feature of the present invention is that the synaptic efficacy of reentrant and intra-group excitatory connections changes depending on the correlation between pre- and postsynaptic activity (see Eqs. 2,3). If such changes in synaptic efficacy are blocked, the pattern of correlations essential for figure-ground segregation does not appear. This is illustrated, for example, in FIG. 3E, which shows the results from a simulation identical to FIG. 3A, except for the absence of synaptic change.

Efficacy changes take place within a few oscillation cycles (less than 100 msec). Before the onset of the stimulus, the synaptic efficacy is at a resting value; however, when connected cells show correlated activity, the efficacy of the reentrant connections between them rapidly increases. This in turn increases the coherency of their firing. On the other hand, the efficacy of reentrant connections linking uncorrelated cells rapidly decreases. In the absence of activity, efficacy decays exponentially with a time constant $\gamma$. Overall, if correlations between connected neuronal groups persist for a few tens of msec, the efficacy of many of the reentrant connections linking these groups will be enhanced. We refer to these transiently enhanced connections as active reentrant connections.

Figure 4A:
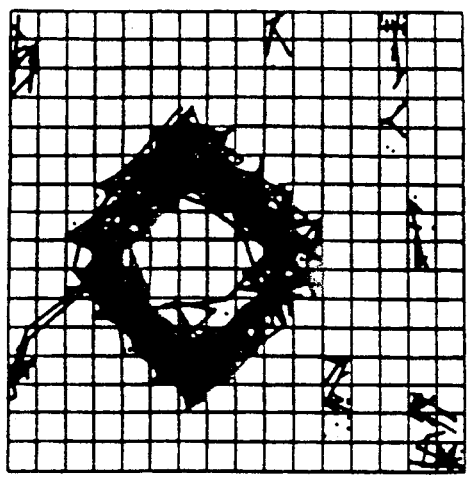
FIG. 4(A) depicts the establishment of active reentrant connections within the repertoire of neuronal group selective for vertically oriented bars moving to the right.

FIG. 4A shows an example of such active reentrant connections. In this case, active reentrant connections have been established within the network of neuronal groups selective for vertically oriented bars moving to the right, 250 msec after the onset of stimulus "A" in FIG. 1. Black lines indicate actively enhanced connections; only strongly enhanced connections (about 5% of the total connectivity) are shown.

Figure 4B:
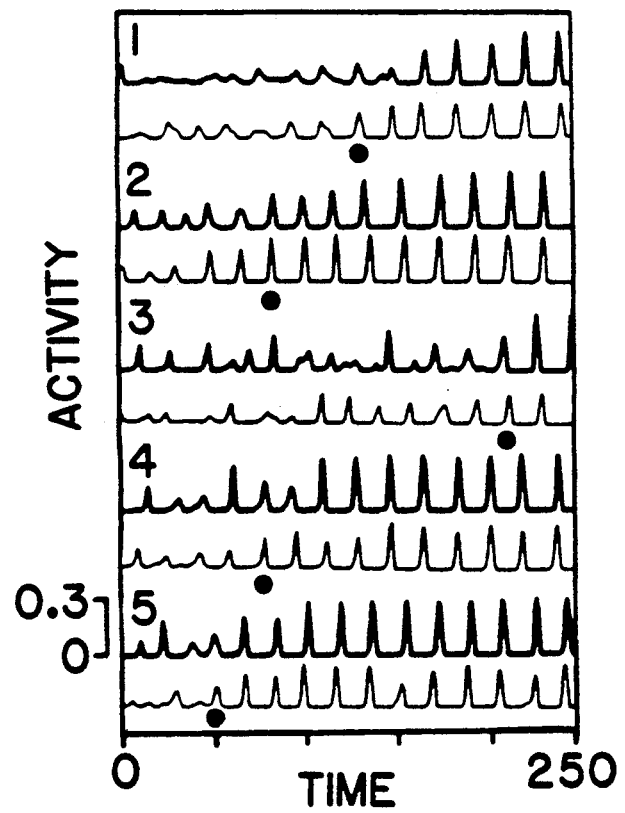
FIG. 4(B) depicts the activity of two neuronal groups at positions 1 (thick lines) and 2 (thin lines) in FIG. 4A after onset of the stimulus.
Figure 4C:
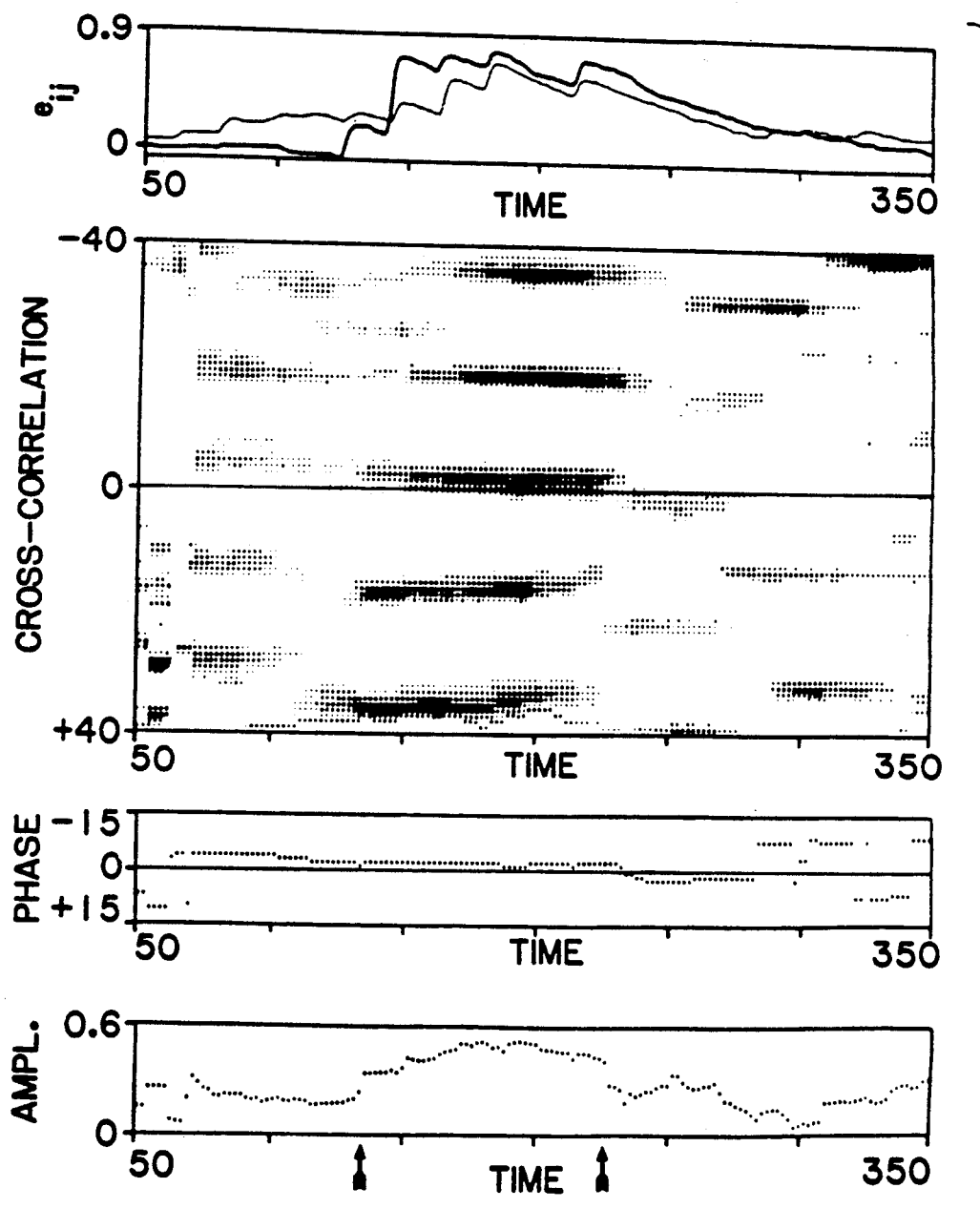
FIG. 4(C) depicts the time course of synaptic efficacy for two individual connections (top panel); the time-stepped cross-correlation function for nearby groups (middle panel); and the phase and amplitude of the central peak of the time-stepped cross-correlation function (bottom panel).

FIG. 4B shows the activity profile of two groups following the onset of the stimulus. The groups rapidly increase their level of activity and synchronization after a variable delay, usually within 100 msec. The figure shows the activity of two neuronal groups at positions 1 (thick lines) and 2 (thin lines) in FIG. 1A after onset of the stimulus. Five trials (1–5) 16 are shown. The onset of synchronization is indicated by a black dot.

The time course of synaptic efficacy change and of the cross-correlation for two reentrantly connected groups is shown in FIG. 4C. All other parameters being equal, changes in the synaptic decay $\gamma$ or in the modification thresholds $\kappa_{I,J}$ (Eq. 2) have a profound effect on the overall dynamics of the system. For slow decay and low thresholds (FIG. 3; FIG. 4A,B) synchronization of groups is virtually permanent and active reentrant connections, once formed, are stable for as long as the stimulus is present. By contrast, very fast synaptic decay or high thresholds prevent any synchronization. Within an intermediate range, synchronization after stimulus onset is rapid but transient. An example is shown in FIG. 4C (middle and bottom panels). Time-stepped evaluation of the cross-correlation function reveals an episode of coherent activity with near-zero phase lag and high amplitude between 125 and 225 msec (marked by arrows), followed by a rapid decrease in coherency and the appearance of large phase shifts (e.g. at 300 msec). Coherent episodes may occur at different times in different trials, and their length may vary significantly. Episodes cf coherent activity coincide in time with episodes of enhanced efficacy of reentrant connections (FIG. 4C, compare middle panel with top panel).

FIG. 4C, top panel shows the time course of synaptic efficacy for two individual connections (thick and thin lines) linking cells in nearby groups. (In this case, $e_{ij}$ varies between −0.1 and 0.9, since $c_{ij}$ was set to 0.1, see Eq. 1.) In FIG. 4C, middle panel the time-stepped cross-correlation function is shown for the same nearby groups during the same trial. The cross-correlation function is evaluated every 2 msec, starting with msec 1-100 (i.e. centered on 50 msec). The cross-correlation amplitude is coded as stippling density. In FIG. 4C, bottom panels the phase and amplitude of the central peak of the time-stepped cross-correlation function is shown. Note the simultaneous occurrence (within the time period marked by arrows) of enhanced synaptic efficacy, increased cross-correlation amplitude and near-zero phase lag. In this case $\gamma$ was set to 0.015 (see Eq. 2); all other parameters are as in FIGS. 3 and 4A,B.

The present invention introduces to robotics an embodiment based upon a model that shows how the visual cortex might deal with the problems of perceptual grouping and segmentation. In this embodiment, a possible basis for grouping and segregation is implicit in the pattern of reentrant cortical connections. The integration and segregation of elementary features into objects and background is expressed by the ensuing pattern of temporal correlations among neuronal groups. The dynamic and transient nature of these correlations is accounted for by short-term changes in the efficacy of reentrant connections.

Apparatus according to the present invention is able to: (i) Group together elementary features of the same kind (vertical bars) belonging to an extended and coherently moving figure, and segregate them from an incoherent background of randomly moving bars (FIG. 1A). The grouping was rapid (within 100-200 msec), in agreement with psychophysical data, and, as a result of preferential connections among nearby neuronal groups with similar orientation and direction specificity, it showed behavior consistent with the Gestalt laws of continuity, proximity, similarity, and common motion; (ii) Segregate a figure from a coherent background moving in a different direction (FIG. 1B) and also (iii) from another coherent figure (FIG. 1C). (iv) Group together elementary features of different kinds (vertical and horizontal bars) belonging to a single, coherently moving figure (a square moving right-up), and segregate them from another equivalent set of features belonging to a different figure (a square moving left-down, FIG. 1D). This last task would be particularly difficult for an "assembly" model based upon mean activity levels.

Reentry is critical for the establishment of temporal correlations among neuronal groups Reentrant connectivity must be strong enough to generate, amplify, and maintain such correlations, but should not activate groups that do not receive external input. This problem has been encountered in other models: some have simply imposed the mathematical condition that only active oscillators ar strongly coupled; others have proposed that reentrant connections are of a special "linking" type, which renders them ineffective in the absence of other inputs. In the present model, on the other hand, synaptic efficacy is allowed to change rapidly depending on pre- and postsynaptic activity. This helps to prevent activity from spreading indiscriminately and, at the same time, it enhances and preserves the emerging correlations.

Although the invention has been described by a particular embodiment and demonstrated by a specific example, it should be understood that the invention incompasses more than these details as stated in the following claims:

We claim:

1. Apparatus for distinguishing moving figures from background in a visual field comprising
    means for providing visual field data as intensity values data to a computer,
    an input array of intensity values in said computer whose state corresponds to said intensity values,
    a first network of motion detecting neural elements receiving first connections from said input array,
    said first connections each comprising a synapse having a synaptic strength,
    a second network comprising layers of neuronal groups, each layer comprising direction and orientation detecting neuronal elements receiving second connections topographically connected to said first network,
    each second connection comprising a synapse having a synaptic strength,
    a third set of connections between elements of the same layer of neuronal groups and comprising synapses having a synaptic strength and a synaptic efficacy, and
    a fourth set of connections providing reentrant connections between said layers of neuronal groups said reentrant connections further comprising synapses having a synaptic strength and a synaptic efficacy,
    said synaptic efficacy of said reentrant connections being governed by an amplification function and varying with time, and wherein correlations of activity between said layers of neuronal groups increases the efficacy of said reentrant connections and groups in said layers that are not correlated are decoupled by decreasing the efficacy of said reentrant connections.

2. The apparatus for distinguishing moving figures from background of claim 1 wherein the density of said third set of connections within said layers of neuronal groups decreases with distance form each neuronal element.

3. Apparatus for distinguishing moving figures from background in a visual field comprising
    means for providing visual field data s intensity values data to a computer,
    an input array of intensity values in said computer whose state corresponds to said intensity values,
    a first network of motion detecting neuronal elements receiving first connections from said input array,
    said first connections each comprising a synapse having a synaptic strength,
    a second network comprising layers of neuronal groups, each layer comprising direction and orientation detecting neuronal elements receiving second connections topographically connected to said first network,
    each second connection comprising a synapse having a synaptic strength,
    a third set of connections between elements of the same layer of neuronal groups and comprising synapses having a synaptic strength and a synoptic efficacy, and a fourth set of connections providing reentrant connections between said layers of neuronal groups said reentrant connections further comprising synapses having a synaptic strength and a synaptic efficacy, and a layer of cells connected to said second network enabled to detect correlated neuronal activity and signal and location of objects in the visual field, said synaptic efficacy of said reentrant connections being governed by an amplification function and varying with time, and wherein correlations of activity between said layers of neuronal groups increases the efficacy of said reentrant connection and groups in said layers that are not correlated here decoupled by deceasing the efficacy of said reentrant connections.

4. The apparatus for distinguishing moving figures from background of claim 3 wherein said fourth set of connections comprises pre- and post-syntactic neuronal elements whose correlated activity causes a change in the state of cells in said additional layer of cells.

* * * * *